Patented June 5, 1928.

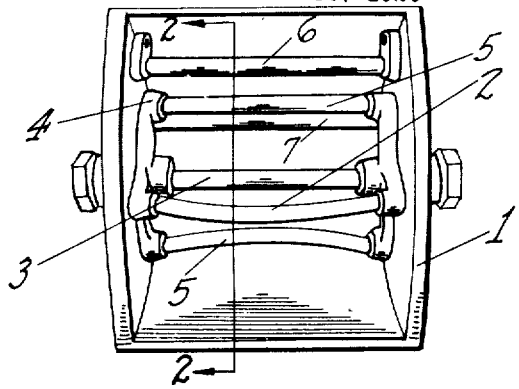
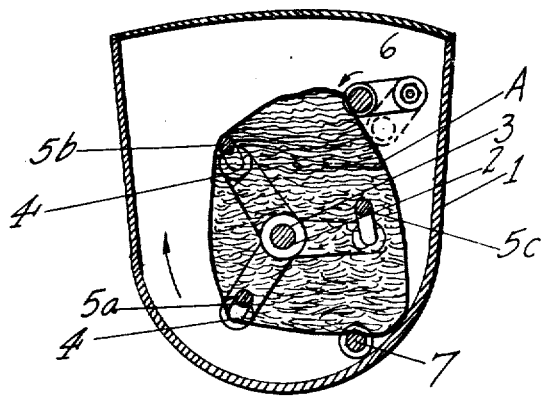
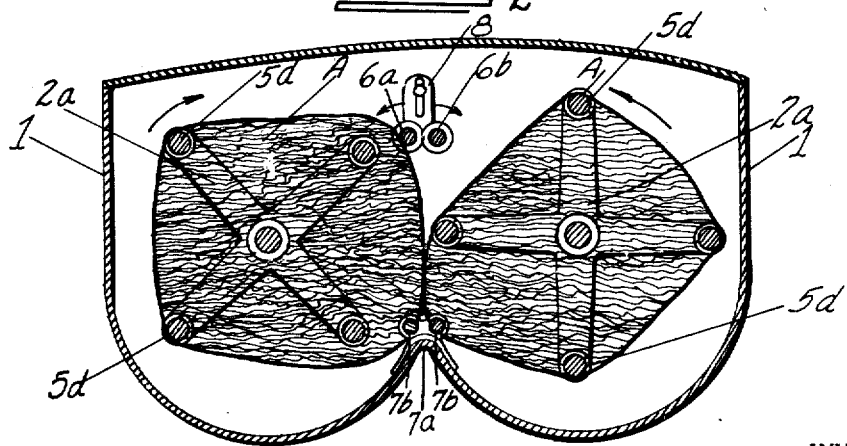

1,672,264

UNITED STATES PATENT OFFICE.

FRANK X. LAUTERBUR AND EDWARD J. LAUTERBUR, OF SIDNEY, OHIO.

PROCESS OF MIXING DOUGH.

Application filed November 30, 1926. Serial No. 151,802.

Our invention relates to processes of mixing dough consisting of flour and water and the other ingredients from which breads and pastries are made.

It is the object of our invention to provide a new process in which overheating during the dough mixing operation, particularly the kneading stage, is more definitely limited than has heretofore been possible. It is a further object to provide a process in which the tendency of a dough mass, when it has reached a certain density, to produce friction by contact with a mixing bowl wall, is reduced very materially. It is a further object to provide a process which, while it thoroughly mixes a dough mass and kneads the dough, at the same time accomplishes mixing and stretching by physical manipulation of the dough mass itself, with the least possible interaction between the dough and the mixer bowl walls or other retarding means. It is also our object to provide a process in which a finished dough mass may be prepared in much less time than has heretofore been possible.

Referring to the drawings in which we have illustrated suitable apparatus for carrying out the dough mixing process in accordance with our invention:—

Figure 1 is a perspective view from above of the mixing bowl which is described in our co-pending application Serial No. 131,478, filed August 24, 1926, which we find suitable for carrying out our novel process.

Figure 2 is a vertical section along the lines 2—2 in Figure 1, with a dough mass indicated, which is being handled in accordance with our new process.

Figure 3 shows a different type of apparatus in which the same physical manipulation of the dough mass may be produced.

Inasmuch as our process may be carried out in the new type of mixer described in our co-pending application Serial No. 131,478, we have shown several views taken from the drawings in this application. We have further indicated a different type of apparatus which may also be used.

First describing the apparatus which is illustrated, we have shown the mixing bowl 1, within which there is provided some mechanical means such as is indicated at 2 in Figures 1 and 2, or at 2ª in Figure 3. The preferred type of agitator, which is shown in Figures 1 and 2, comprises a central shaft 3 having spiders 4 attached at the ends thereto, between which the agitating bars 5 are extended. We have shown bars having curved portions, one bar 5ª curving inwardly toward the axis of the agitator shaft, one bar 5ᵇ curving outwardly from the axis, and one bar 5ᶜ curving from the ends from front to back in the direction of rotation of the bar. As noted in our co-pending application, we have found this type of agitator very effective for thoroughly mixing a dough mass without causing undue tearing strain or violently projecting the dough mass across the bowl. Such a form of agitator tends to mix the dough in concentric cylindrical formations in axial alignment with the axis of the agitator shaft. We have further shown in Figures 1 and 2 an adjustably mounted bar which will be preferably freely rotatable at 6. This bar is disposed in such position with relation to a dough mass being whirled about on the agitator, that the bar will tend to prevent the dough mass being thrown against the walls of the bowl. The function of the bar 6 might be described as a deflecting function, as the dough mass is, at this position, guided back into the spool-like formation being carried around on the bowl. Further down at the side of the bowl wall there is provided a deflecting roll 7 which holds back the dough and tends to retard the downward fling of the dough mass and guide the dough mass back toward the agitator, so that the bottom part of the bowl will, after the mass becomes sufficiently tough, have a cooling air space.

In Figure 3 we have shown a different type of agitator formed in two compartments each with an agitator 2ª therein. The cross bars 5ᵈ are straight, and instead of three bars, four are provided. The agitators operate in opposite directions, the rotaton of the agitator on the left, as shown, being clockwise, and the rotation of the agitator on the right being counterclockwise. The deflecting rollers are indicated at 6ª, 6ᵇ, being mounted on an adjustable bracket 8. Instead of the retarding roller 7 in the form of structure which we have shown in Figures 1 and 2, we have formed up the bottom of the bowl as indicated at 7ª, into an inverted U. Rollers 7ᵇ may be used here also. The batch of dough carried by each agitator will be retarded both by the dough mass carried on the opposite agitator, and by rubbing against the inverted U shaped bowl bottom. In both cases the dough mass will be swung by the rotating agitator free of the bowl bottom, so that an air space will be formed which will aid greatly in overcoming the tendency for the dough mass to heat up.

In the two mixing bowls which we have shown, it will be noted that we require suitable mixing devices for keeping the dough mass clear of the bowl bottom when the dough has reached a kneading consistency, so as to form an air space below the dough mass. We further so manipulate the dough, that most of the tendency to stretch the dough mechanically will be provided without application of external friction, and the agitator will pick up the dough and tend just enough to centrifugally throw out the dough, that stretching will result. Thus, it is our aim to stretch the dough mass by a spinning action, with elimination of centrifugal motion, instead of allowing a mass of dough to remain in a fixed position and passing arms through it to stretch it.

We have indicated the preferred position in which the dough mass will be kept during kneading in Figures 2 and 3, in the shaded area A. In carrying out our novel process, we first mix the ingredients either in the bowl itself, or in some auxiliary mixing device. The particular step in the dough mixing operation, which it is our object to control, is that step during other processes when frictional heating ordinarily begins and the toughening dough mass begins to drag against the bowl wall. Ordinarily in all other types of mixers with which we are familiar, the heating of the dough mass is materially affected by the friction against the bowl bottom. It is our effort, therefore, to avoid the greatest source of friction, and also in doing this to effectively cool the dough mass. This object we believe to be directly opposed to present practice in which the dough is held in fixed position, with the blades working through it.

In the kneading step in our process, we carry a dough mass on agitators moving at what is called in the trade a high speed. In some localities, a rate of 20 R. P. M. is considered high, while in other sections mixers operating at as high rates at 100 to 120 R. P. M. have been developed. As the dough mass is carried around on the agitator at a high rate of speed, the dough mass tends to be centrifugally projected against the sides of the bowl wall as it starts on its downward movement. At this position we provide diverting means such as is indicated in the drawings by the diverting rollers 6, 6ª, 6ᵇ. Although it is possible to fix these diverting rollers at a certain position within the bowl wall, it is preferable to provide an adjustable mounting so that the correct function for dough masses of variable densities can be accurately controlled. The diverting step consists in providing some means such as freely rotatable rollers, which will yield or turn sufficiently to divert the dough, causing it to move downwardly without tearing it. In its downward movement it meets another yielding abutment, such as is provided by the rotatable roller 7, the oppositely moving dough mass, as in Figure 3, or the inverted U shaped bowl bottom 7ª, also indicated in Figure 3. The lower diverting or retarding means tends to delay the movement of the dough mass sufficiently for the agitator arms to carry the mass free of the bowl bottom. The provision of mechanical control which will cause the dough mass to swing clear of the bowl bottom is most important, as in this way, a cooling air space is provided which cools the dough mass in just the position where other processes of kneading have produced the greatest friction. The only position within the mixing bowl where we cause the dough mass to engage the bowl wall, is where the gravitational drop and centrifugal throw of the mass makes it impossible to avoid what might be called a positive frictional engagement.

Thus it is the essence of our novel process to so manipulate the dough mass when it has reached the density desired for kneading, that frictional heating up is avoided, and cooling air spaces are provided.

Having thus described our novel process what we claim as new and desire to secure by Letters Patent is:—

1. The steps in the process of dough mixing occurring subsequent to the agitation of the dough ingredients in order to bring them to a consistency to require kneading, which consists, during the kneading stage, in rotating and agitating the dough in a mass within a receptacle and deflecting the dough mass away from frictional engagement with a wall of the receptacle in which the kneading is being carried out, against which wall the combined centrifugal forces of rotation acting thereon would tend to project said dough mass, thereby preventing overheating of said dough mass.

2. The steps in the process of dough mixing occurring subsequent to the agitation of the dough ingredients in order to bring them to a consistency to require kneading, which consists, during the kneading stage, in rotating and agitating the dough in a mass within a receptacle and deflecting the dough mass away from frictional engagement with a wall of the receptacle in which the kneading is being carried out, against which wall the combined centrifugal forces of rotation acting thereon would tend to project said dough mass, and enforcing an air space for the cooling action thereof between the said wall and the rotating dough mass, thereby preventing overheating of said dough mass.

3. That process of kneading dough and preventing the overheating thereof, which consists in rotating and agitating a dough mass within a walled receptacle, and so deflecting the dough mass as to keep it away from the bottom wall of the receptacle during the kneading stage.

4. That process of kneading dough and preventing the overheating thereof, which consists in rotating and agitating a dough mass within a walled receptacle, and so deflecting the dough mass as to keep it away from the bottom wall of the receptacle during the kneading stage, and also diverting the dough mass from contact with other walls of the receptacle during the rotation of the dough mass within the receptacle.

5. That process of kneading dough mechanically, which consists in rotating and agitating a dough mass within a walled receptacle, and diverting the dough mass from frictional engagement with the walls of the receptacle.

6. That process of dough mixing, which consists in mechanically rotating and agitating and thus working a dough mass within a walled receptacle, and diverting the dough mass from frictional engagement with the walls of the receptacle during the kneading stage at least.

FRANK X. LAUTERBUR.
EDWARD J. LAUTERBUR.

DISCLAIMER 1,672,264.—*Frank X. Lauterbur* and *Edward J. Lauterbur*, Sidney, Ohio. PROCESS OF MIXING DOUGH. Patent dated June 5, 1928. Disclaimer filed February 13, 1930, by the *patentees*.

Enter this disclaimer to certain of the process claims of the above identified patent—Namely, claims 1 and 2 excepting when in the process claimed the process of preventing overheating of a dough mass is accomplished by mixing the dough so that there is no substantial frictional contact of the dough with that portion of the receptacle walls against which gravity and the centrifugal force due to rotation, combined, would tend to project said mass.

[*Official Gazette March 4, 1930.*]

and the rotating dough mass, thereby preventing overheating of said dough mass.

3. That process of kneading dough and preventing the overheating thereof, which consists in rotating and agitating a dough mass within a walled receptacle, and so deflecting the dough mass as to keep it away from the bottom wall of the receptacle during the kneading stage.

4. That process of kneading dough and preventing the overheating thereof, which consists in rotating and agitating a dough mass within a walled receptacle, and so deflecting the dough mass as to keep it away from the bottom wall of the receptacle during the kneading stage, and also diverting the dough mass from contact with other walls of the receptacle during the rotation of the dough mass within the receptacle.

5. That process of kneading dough mechanically, which consists in rotating and agitating a dough mass within a walled receptacle, and diverting the dough mass from frictional engagement with the walls of the receptacle.

6. That process of dough mixing, which consists in mechanically rotating and agitating and thus working a dough mass within a walled receptacle, and diverting the dough mass from frictional engagement with the walls of the receptacle during the kneading stage at least.

FRANK X. LAUTERBUR.
EDWARD J. LAUTERBUR.

DISCLAIMER 1,672,264.—*Frank X. Lauterbur* and *Edward J. Lauterbur*, Sidney, Ohio. PROCESS OF MIXING DOUGH. Patent dated June 5, 1928. Disclaimer filed February 13, 1930, by the *patentees*.

Enter this disclaimer to certain of the process claims of the above identified patent—Namely, claims 1 and 2 excepting when in the process claimed the process of preventing overheating of a dough mass is accomplished by mixing the dough so that there is no substantial frictional contact of the dough with that portion of the receptacle walls against which gravity and the centrifugal force due to rotation, combined, would tend to project said mass.

[*Official Gazette March 4, 1930.*]